(12) United States Patent
Gotou et al.

(10) Patent No.: US 8,917,292 B2
(45) Date of Patent: Dec. 23, 2014

(54) DISPLAY SYSTEM FOR WORKING MACHINE

(75) Inventors: Yuuki Gotou, Tsuchiura (JP); Kazuhiro Shibamori, Joso (JP); Keiichiro Nakamura, Mito (JP); Hidenobu Tsukada, Ushiku (JP); Kouta Fujieda, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 89 days.

(21) Appl. No.: 13/823,514

(22) PCT Filed: Sep. 15, 2011

(86) PCT No.: PCT/JP2011/071157
§ 371 (c)(1),
(2), (4) Date: Mar. 14, 2013

(87) PCT Pub. No.: WO2012/036248
PCT Pub. Date: Mar. 22, 2012

(65) Prior Publication Data
US 2013/0169690 A1 Jul. 4, 2013

(30) Foreign Application Priority Data
Sep. 17, 2010 (JP) ................................. 2010-208793

(51) Int. Cl.
*G09G 5/00* (2006.01)
(Continued)

(52) U.S. Cl.
CPC *G09G 5/373* (2013.01); *E02F 9/24* (2013.01); *E02F 9/26* (2013.01);
(Continued)

(58) Field of Classification Search
CPC ............. G09G 5/373; E02F 9/24; E02F 9/26; E02F 9/261; E02F 9/267; B60R 2300/207; B60R 2300/8093; B60R 2300/302; B60R 2300/8026; B60R 1/00
USPC ..................... 345/660; 340/439, 904; 701/50; 348/143, 148
See application file for complete search history.

(56) References Cited

U.S. PATENT DOCUMENTS 7,817,021 B2 * 10/2010 Date et al. ..................... 340/438
2002/0015062 A1 2/2002 Shimazu et al.
(Continued)

FOREIGN PATENT DOCUMENTS

JP 2002-121776 A 4/2002
JP 2002-275949 A 9/2002
(Continued)

*Primary Examiner* — Jin-Cheng Wang
(74) *Attorney, Agent, or Firm* — Mattingly & Malur, PC

(57) ABSTRACT

A display system for a working machine displays warning information while also displaying a high-quality camera image. The display redisplays a reduced camera image at a reduction scale of 60% according to an abnormality information signal. An open area 44 outside the area displaying the camera image. The display control device displays a warning icon (large size), corresponding to abnormality information regarding a filter of a DPF device, in the open area. The operator recognizes the warning and immediately stops the operation, moves to a place where the filter regeneration is possible while checking the safety of the surroundings by viewing the camera image, and then carries out the filter regeneration. After finishing, the operator confirms that the warning icon has disappeared, moves to the site of the operation while checking the safety of the surroundings by viewing the camera image (for normal times), and then restarts the operation.

3 Claims, 10 Drawing Sheets

(51) Int. Cl.

| | | |
|---|---|---|
| *E02F 9/26* | (2006.01) | |
| *G09G 5/373* | (2006.01) | |
| *E02F 9/24* | (2006.01) | |
| *B60R 1/00* | (2006.01) | |
| *H04N 7/18* | (2006.01) | |
| *H04N 1/00* | (2006.01) | |

(52) U.S. Cl.
CPC .... *B60R 2300/207* (2013.01); *B60R 2300/302* (2013.01); *B60R 2300/8093* (2013.01); *B60R 1/00* (2013.01); *B60R 2300/8026* (2013.01); *E02F 9/267* (2013.01); *H04N 7/18* (2013.01); *E02F 9/261* (2013.01); *H04N 1/0044* (2013.01)
USPC .......... 345/660; 348/143; 348/148; 348/125; 701/50; 340/439; 340/904

(56) References Cited

U.S. PATENT DOCUMENTS

| | | | |
|---|---|---|---|
| 2005/0145793 A1* | 7/2005 | Abe et al. .................... | 250/311 |
| 2005/0151845 A1* | 7/2005 | Tsukada et al. .............. | 348/148 |
| 2007/0171087 A1 | 7/2007 | Shimazu et al. | |
| 2009/0009308 A1* | 1/2009 | Date et al. .................... | 340/439 |
| 2011/0254700 A1* | 10/2011 | Gharsalli et al. ............. | 340/904 |
| 2012/0038685 A1* | 2/2012 | Tanaka et al. ................ | 345/690 |

FOREIGN PATENT DOCUMENTS

| | | |
|---|---|---|
| JP | 2002-293164 A | 10/2002 |
| JP | 2005-163370 A | 6/2005 |
| JP | 2010-101068 A | 5/2010 |

* cited by examiner

DISPLAY SYSTEM FOR WORKING MACHINE

TECHNICAL FIELD

The present invention relates to a display system for a working machine (e.g., hydraulic shovel) which is arranged in the cab (operating room) of the working machine to let the operator recognize various types of information.

BACKGROUND ART

In the cab of a hydraulic shovel (as an example of the working machine), various types of instruments (indicators) are arranged to let the operator check basic information on vehicle body status of the hydraulic shovel. Such instruments include a coolant temperature indicator, a hydraulic fluid temperature indicator, a fuel level indicator and an engine revolution speed indicator, for example. In addition to these indicators, an hour meter indicating the operating time of the hydraulic shovel, switching position information on the gate lock lever, etc. are also displayed as needed.

In recent years, hydraulic shovels are adapted to display various types of information on the hydraulic shovel (including the information on the above instruments) all together on a monitor such as a liquid crystal display. In normal times, such a monitor displays basic information on the vehicle body status such as the coolant temperature and the fuel level. However, in cases where an abnormality has occurred to the hydraulic shovel, for example, it is necessary to notify the operator of warning information (indicating the occurrence of the abnormality, the contents of the abnormality, countermeasures to be taken, etc.) by displaying the warning information.

Further, since the rearward visual field for the operator manipulating the machine in the cab is insufficient, a monitoring camera is attached to the rear part of the hydraulic shovel and a camera image acquired from the camera is displayed on the monitor. This secures an auxiliary visual field in back of the hydraulic shovel and enables safe operations.

Incidentally, such a monitor is desired to be as compact as possible in order to secure the operator's visual field. Further, the amount of information displayed on the monitor is on the rise in these years with the increase in the functions of hydraulic shovels. It is therefore necessary to efficiently display a larger amount of information in a limited display area.

It is also possible to manually or automatically switch the displayed image among the basic information, the warning information and the camera image. However, the manual switching of the displayed image is undesirable since it forces the operator to perform the switching during the operation and can disturb the operator's concentration. The automatic switching of the displayed image is also undesirable since automatic switching against the operator's intention can occur. In such cases, the operator cannot view a necessary image and that can obstruct the operation.

As a conventional technique for addressing this problem, Patent Literature 1 has proposed a display system which superimposes the basic information and the camera image together in a style allowing the camera image to be viewed through. This superimposition of the basic information and the camera image allows the operator to check the safety with a sufficient rearward visual field while also checking the vehicle body status of the hydraulic shovel. However, even this technique has a problem in that the image quality of the superimposition area in the camera image deteriorates in some degree and the area becomes hard to see. To deal with this problem, the superimposition area is set in a part of the camera image corresponding to the left rear view from the hydraulic shovel. For the left rear range, the operator checks the safety by performing both the direct visual check (by turning around) and the visual check via a rearview mirror.

There has also been proposed a display system which superimposes the warning information (instead of the basic information) and the camera image together in a style allowing the camera image to be viewed through.

PRIOR ART LITERATURE

Patent Literature

Patent Literature 1: JP, A 2005-163370

SUMMARY OF THE INVENTION

Problem to be Solved by the Invention

Incidentally, a typical example of the case where the operator wants to view both the warning information and the camera image at the same time is, for example, a case where a warning that can lead to a failure has been displayed and the operator moves the working machine to a place where there is no interference with necessary operations (in order to check the cause and details of the warning) while checking the safety of the surroundings.

The operation of checking the cause and details of the warning is a special operation that is different from the operations in normal times. Depending on the contents of the warning and the contents of the failure accompanying the warning, the working machine can move in a way unintended by the operator. Thus, the operator has to carefully move the working machine to an appropriate place (where the check and/or repair can be carried out) while checking the safety of the surroundings. Being required even more careful safety check, the operator is desired to check the safety not only by the ordinary visual check but also by using a high-quality camera image displayed on the monitor.

It is therefore the primary object of the present invention to provide a display system for a working machine that is capable of displaying the warning information while also displaying a high-quality camera image.

Means for Solving the Problem (1) To achieve the above object, the present invention provides a display system for a working machine, comprising a monitor and a display control device for displaying a prescribed image on the monitor, wherein the display control device has: a first image display function of displaying a constantly displayed first image in a first image area on the monitor; a first image reduction function of displaying the first image in a reduced size according to a prescribed signal; and a second image display function of displaying a second image regarding the prescribed signal in a second image area as an open area in the first image area, the second image area being outside the area of the first image displayed in the reduced size. The display system for a working machine further comprises abnormality detection means which detects an abnormality of the working machine. The prescribed signal is an abnormality information signal from the abnormality detection means. The second image is a warning image corresponding to the abnormality information acquired from the abnormality detection means. An importance level of each piece of abnormality information is set in the display control device. The display control device further has an importance level judgment function of judging the importance level of the abnormality information acquired from the abnormality detection means. The first image reduction function sets a reduction scale for the first image based on the importance level judged by the importance level judgment function and displays the first image in a reduced size according to the reduction scale. The second image display function displays the warning image in a size corresponding to the importance level in the second image area as the open area.

By displaying the first image in a reduced size and displaying the second image in the open area (second image area) as in the present invention, the superimposition area in the conventional technique does not occur and the image quality deterioration is avoided. In other words, the second image can be displayed while also displaying the high-quality first image. Further, by setting the reduction scale at a smaller value and displaying a larger-sized warning image when the importance level is high, a remarkable effect of sufficiently calling the operator's attention can be achieved.

(2) Preferably, the above display system (1) further comprises a camera which captures images of the surroundings of the working machine. The first image is a camera image acquired from the camera.

With this configuration, the warning information can be displayed while also displaying a high-quality camera image.

Incidentally, unnecessarily significant reduction of the camera image makes it impossible to achieve the original purpose of displaying the camera image. On the other hand, if the reduction of the camera image is insufficient and the open area is small, the warning image is restricted in size and can fail to sufficiently call the operator's attention.

There are multiple types of abnormality information in regard to a working machine and not all the types of abnormality information are of the same importance level. When the importance level of the abnormality information is low, it is possible to give priority to the original purpose of displaying the camera image by setting the reduction scale at a large value (for not reducing the image size significantly). When the importance level is high, it is possible to sufficiently call the operator's attention by displaying a large-sized warning image by setting the reduction scale at a small value (for reducing the image size significantly).

(4) Preferably, in the above display system (1), the first image reduction function displays the first image by reducing the first image in a longitudinal direction.

Suppose the first image is reduced both in the longitudinal direction and in the short-side direction, the open area occurring in the longitudinal direction can sufficiently display the second image. However, the open area occurring in the short-side direction is smaller than the open area occurring in the longitudinal direction and is insufficient for displaying another image, that is, efficient use of the open area is difficult. Meanwhile, it is desirable to avoid the reduction of the first image as much as possible.

The open area for displaying the second image can be secured by reducing the first image in the longitudinal direction and the degree of reduction of the first image can be lessened by not reducing the first image in the short-side direction.

Effect of the Invention

According to the present invention, the warning information can be displayed while also displaying a high-quality camera image.

MODE FOR CARRYING OUT THE INVENTION

Figure 1:
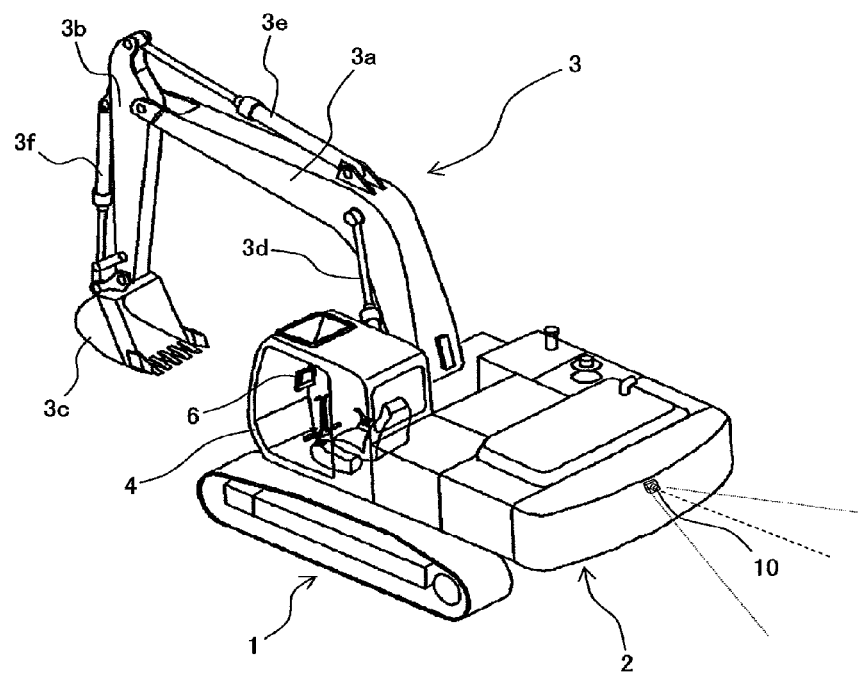
FIG. 1 is a schematic diagram showing the external appearance of a hydraulic shovel.

Referring now to the drawings, a description will be given in detail of a preferred embodiment in accordance with the present invention.

<Configuration>

FIG. 1 is a schematic diagram showing the external appearance of a hydraulic shovel as an example of a working machine in accordance with an embodiment of the present invention. The hydraulic shovel is substantially made up of a lower track structure 1 of the crawler type, an upper swing structure 2 provided to be rotatable with respect to the lower track structure 1, and a front work implement 3 having excavating means or the like.

The lower track structure 1 includes right and left track motors (not shown) for driving and rotating crawlers. The lower track structure 1 travels forward or backward by the rotation of the crawlers driven by the right and left track motors. The upper swing structure 2 includes a cab 4 (see FIG. 2 explained later) in which operating devices, etc. of the hydraulic shovel are arranged, a prime mover (not shown) such as an engine, a swing motor (not shown), etc. By the swing motor, the upper swing structure 2 is swung (swiveled) rightward or leftward with respect to the lower track structure 1. The front work implement 3 is made up of a boom 3a, an arm 3b and a bucket 3c. The boom 3a is moved up and down by a boom cylinder 3d. The arm 3b is operated to the dumping side (opening side) and to the crowding side (scooping side) by an arm cylinder 3e. The bucket 3c is operated to the dumping side and to the crowding side by a bucket cylinder 3f.

Further, in order to eliminate the operator's blind spots and realize safe and efficient operation, the hydraulic shovel is equipped with a rear monitoring camera 10 attached to the counter weight.

Figure 2:
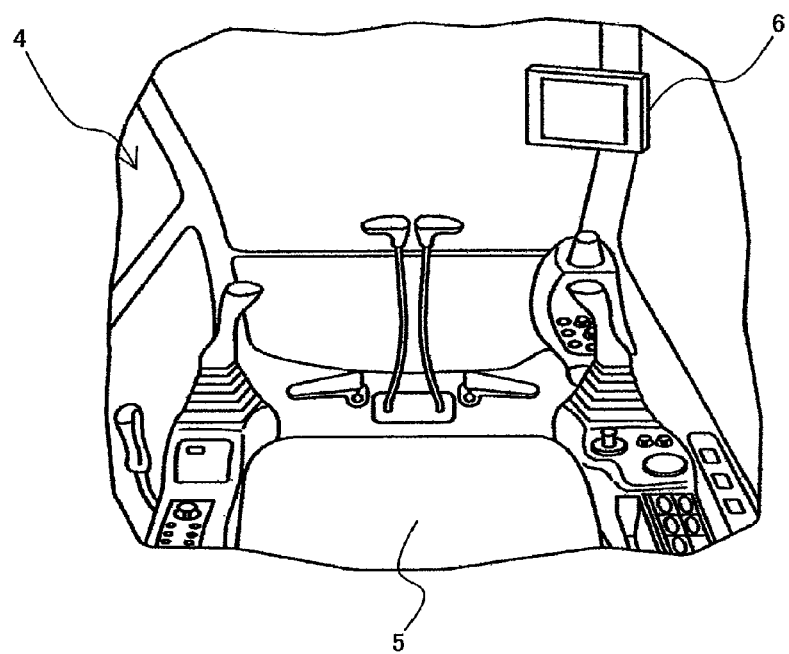
FIG. 2 is a diagram schematically showing the inside of the cab of the hydraulic shovel.

FIG. 2 is a diagram schematically showing the inside of the cab 4 of the hydraulic shovel. The cab 4 includes a cab seat 5 on which the operator is seated. Arranged around the cab seat 5 are control levers for controlling the operations of the hydraulic shovel (traveling by the lower track structure 1, swinging by the upper swing structure 2, earth/sand excavation by the front work implement 3, etc.), a monitor 6 for displaying various types of information (e.g., instruments (indicators)) on the hydraulic shovel (construction machine), etc. The monitor 6 is implemented by a liquid crystal display, for example. In normal times, the monitor 6 displays a camera image 33 and basic information on the vehicle body status such as a coolant temperature indicator 31 and a fuel level indicator 32 (see FIG. 5). The monitor 6 includes a monitor display unit 6a and a monitor operation unit 6b (see FIG. 3).

Figure 3:
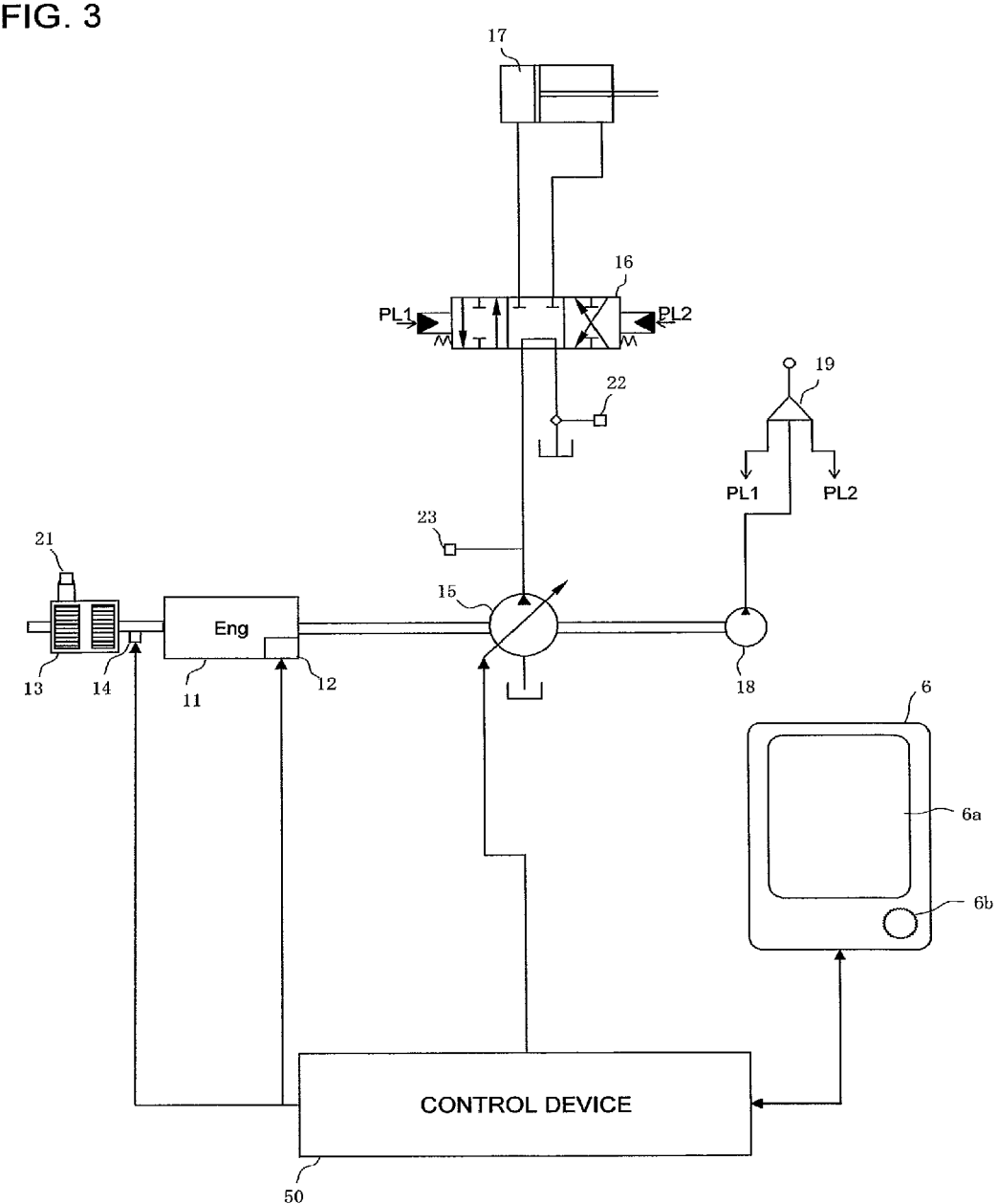
FIG. 3 is a diagram schematically showing the configuration of a control system of the hydraulic shovel which includes a display system.

FIG. 3 is a diagram schematically showing the configuration of a control system of the hydraulic shovel which includes an engine system, a hydraulic drive system and an operating pilot system as well as the display system. The control system is controlled by a control device 50.

The hydraulic shovel performs necessary operations (e.g., excavation) by driving and rotating a hydraulic pump 15 by use of an engine 11 and driving a hydraulic actuator 17 (e.g., the arm cylinder 3e) by use of hydraulic fluid discharged from the hydraulic pump 15.

The engine system includes the engine 11 and a fuel injection device 12. The control device 50 controls the revolution speed and the output torque of the engine 11 by controlling the fuel injection device 12 so that the actual revolution speed of the engine 11 equals a target revolution speed.

Further, the exhaust pipe of the engine 11 is equipped with a DPF device 13. The DPF device 13 collects particulate matter discharged from the engine 11. A regeneration fuel injection device 14 is provided between the engine 11 and the DPF device 13. The regeneration fuel injection device 14 raises the temperature of the exhaust gas by injecting the fuel and thereby removes the particulate matter accumulated on the filter of the DPF device 13. The control device 50 controls the regeneration (regeneration control).

The hydraulic drive system includes the hydraulic pump 15, a control valve 16 and the hydraulic actuator 17. The hydraulic pump 15 is driven and rotated by the engine 11 and discharges the hydraulic fluid. The control valve 16 supplies the hydraulic fluid to the hydraulic actuator 17 by controlling the direction and the flow rate of the hydraulic fluid. The hydraulic actuators 17 are driven by the hydraulic fluid supplied via the control valve 16.

The operating pilot system includes a pilot pump 18 and an operating device 19. The pilot pump 18 is driven and rotated by the engine 11 and generates pilot primary pressure. The operating device 19 generates pilot operation pressures PL1 and PL2 according to its operation direction and operation amount. The control valve 16 is switched by the pilot operation pressures PL1 and PL2 applied thereto.

The display system properly sends information on each control system to the monitor 6 as a display signal and thereby displays the information on the monitor display unit 6a. The display system functions also as a GUI (Graphical User Interface) by inputting the operator's instructions to the control device 50 via the monitor operation unit 6b. The control device 50 executes the display control of the display system.

<Control>

Figure 4:
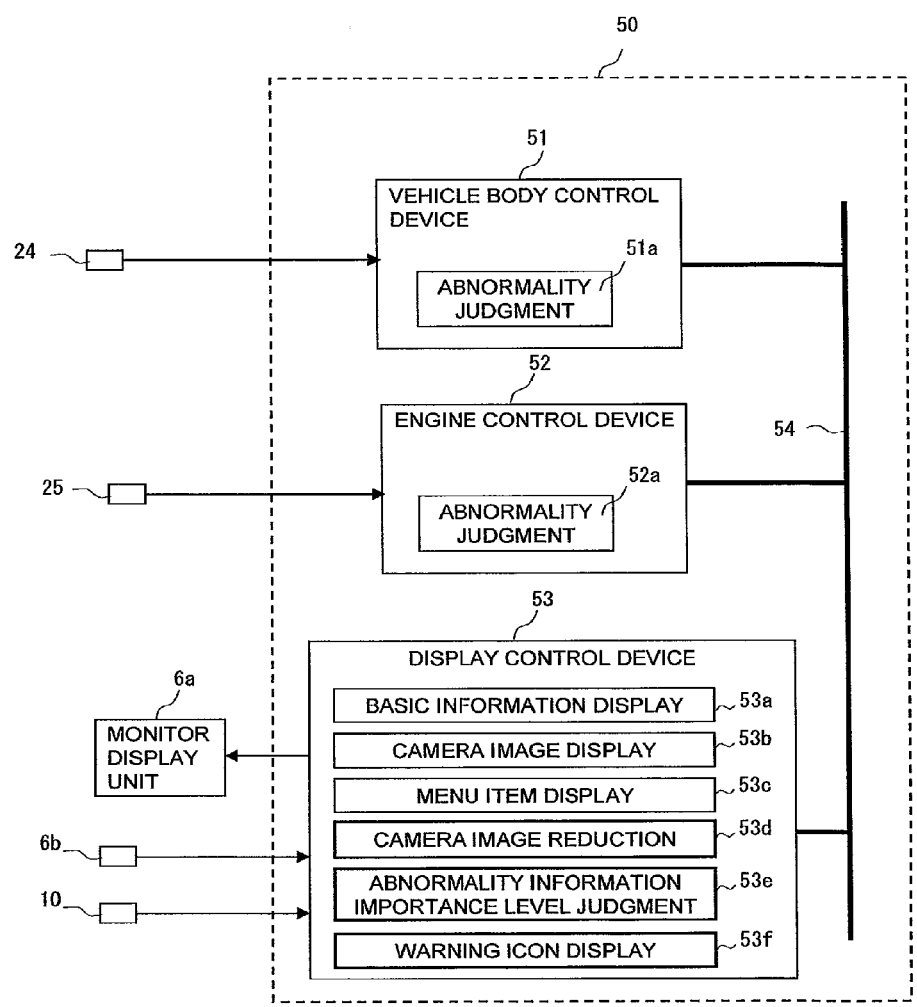
FIG. 4 is a block diagram showing the details of a control device.

FIG. 4 is a block diagram showing the details of the control device 50. The control device 50 includes a vehicle body control device 51, an engine control device 52 and a display control device 53. These control devices 51-53 are interconnected by a communication line 54 to form a vehicle body network.

The vehicle body control device 51 controls the hydraulic drive system. The vehicle body control device 51 receives signals from various types of sensors 24 used mainly for a vehicle body control system such as a differential pressure sensor 21 attached to the DPF device 13 and a differential pressure sensor 22 attached to a hydraulic fluid filter and a hydraulic pump load pressure sensor 23 (hereinafter referred to as "sensors 24") and executes prescribed calculation processes based on the signals. For example, the vehicle body control device 51 detects the operation direction and the operation amount of the operating device 19 and controls the tilting angle (displacement) of the hydraulic pump 15 so that the hydraulic fluid is discharged from the hydraulic pump 15 at a flow rate corresponding to the detected operation direction and operation amount (see FIG. 3). The vehicle body control device 51 includes an abnormality judgment unit 51a. The abnormality judgment unit 51a judges whether an abnormality has occurred or not based on the information from the sensors 24.

The engine control device 52 controls the engine system based on commands from the vehicle body control device 51 and signals from various types of sensors 25 used mainly for an engine control system such as an engine revolution speed sensor (not shown) (hereinafter referred to as "sensors 25"). The engine control device 52 includes an abnormality judgment unit 52a. The abnormality judgment unit 52a judges whether an abnormality has occurred or not based on the information from the sensors 25.

The display control device 53 receives various signals from the sensors 24 and 25 and the results of the calculation processes by the vehicle body control device 51 and the engine control device 52 via the communication line 54, sends the received information to the monitor 6 as display signals, and thereby displays the information on the monitor display unit 6a. The details of the functions of the display control device 53 will be explained below.

The display control device 53 has a basic information display function 53a, a camera image display function 53b and a menu item display function 53c. The display control device 53 also has a camera image reduction function 53d, an abnormality information importance level judgment function 53e and a warning icon display function 53f as its characteristic features. Each of the functions carries out display control which will be explained later.

Figure 5:
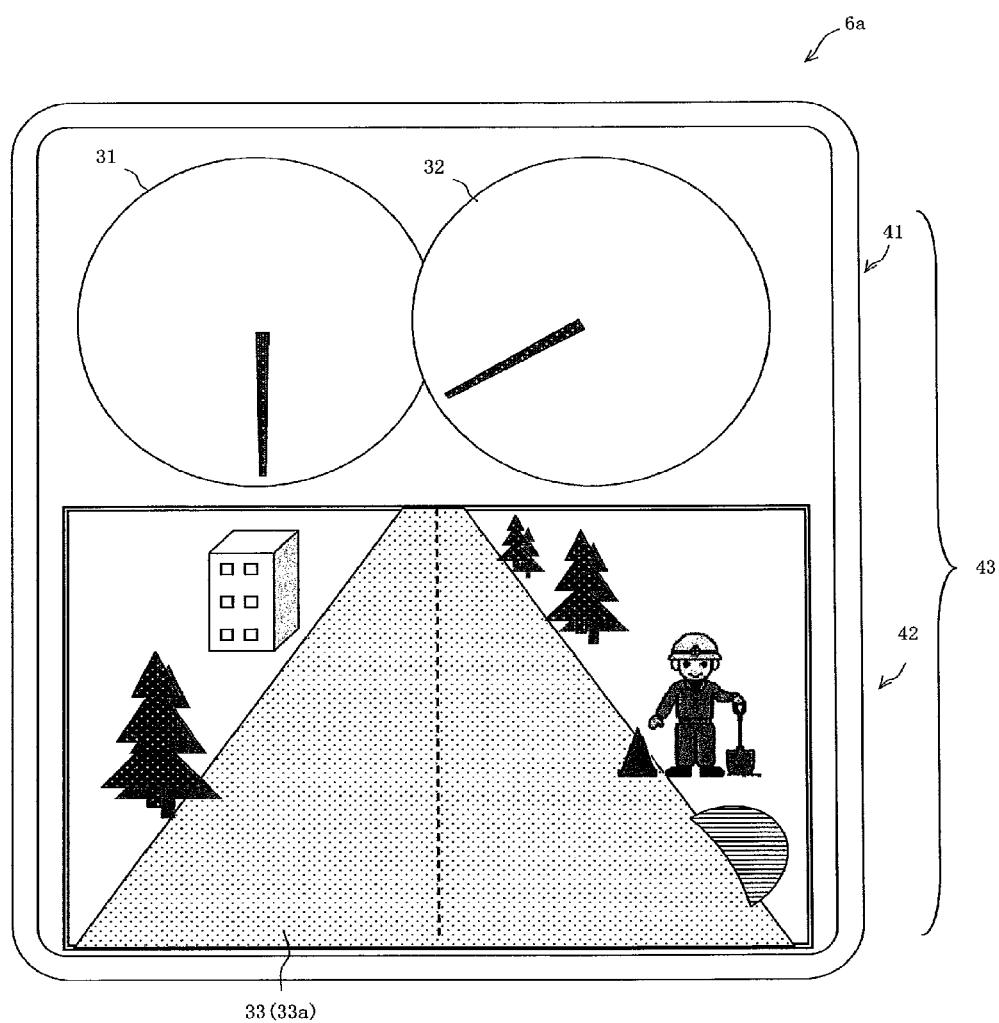
FIG. 5 shows an example of a display screen in normal times.

The basic information display function 53a receives various signals from the sensors 24 and 25 and displays an image regarding the basic information on the coolant temperature indicator 31 and the fuel level indicator 32 in a basic information display area 41 (see FIG. 5).

The camera image display function 53b receives an image signal of a camera image acquired from the camera 10 and displays the camera image 33a in a camera image area 42 (see FIG. 5).

The menu item display function 53c displays a menu item screen in a whole area 43 including the basic information display area 41 and the camera image area 42 according to a switching instruction inputted by the operator through the monitor operation unit 6b. Further, a screen regarding a selected item is displayed on the menu item screen according to a switching instruction inputted by the operator through the monitor operation unit 6b. Explanation of details is omitted for brevity.

Figure 6:
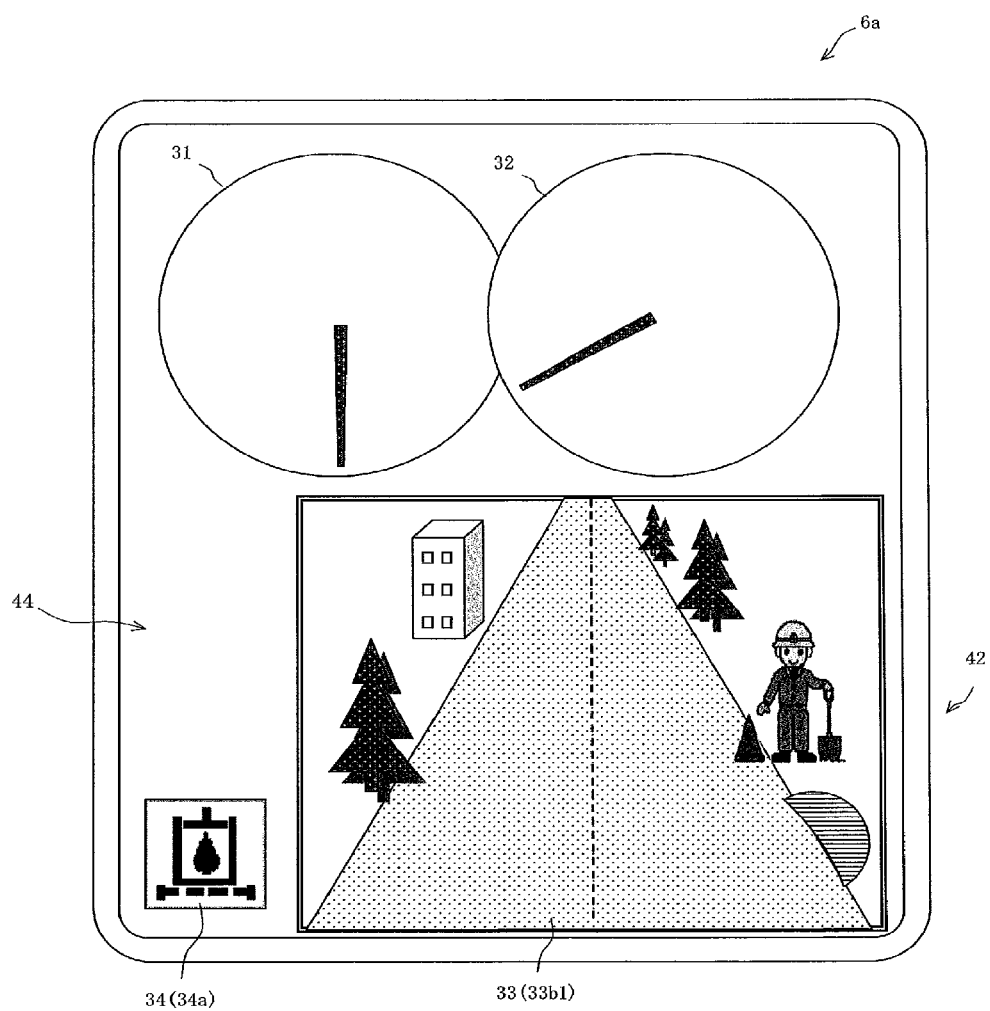
FIG. 6 shows an example of the display screen in abnormal times (importance level: low).
Figure 7:
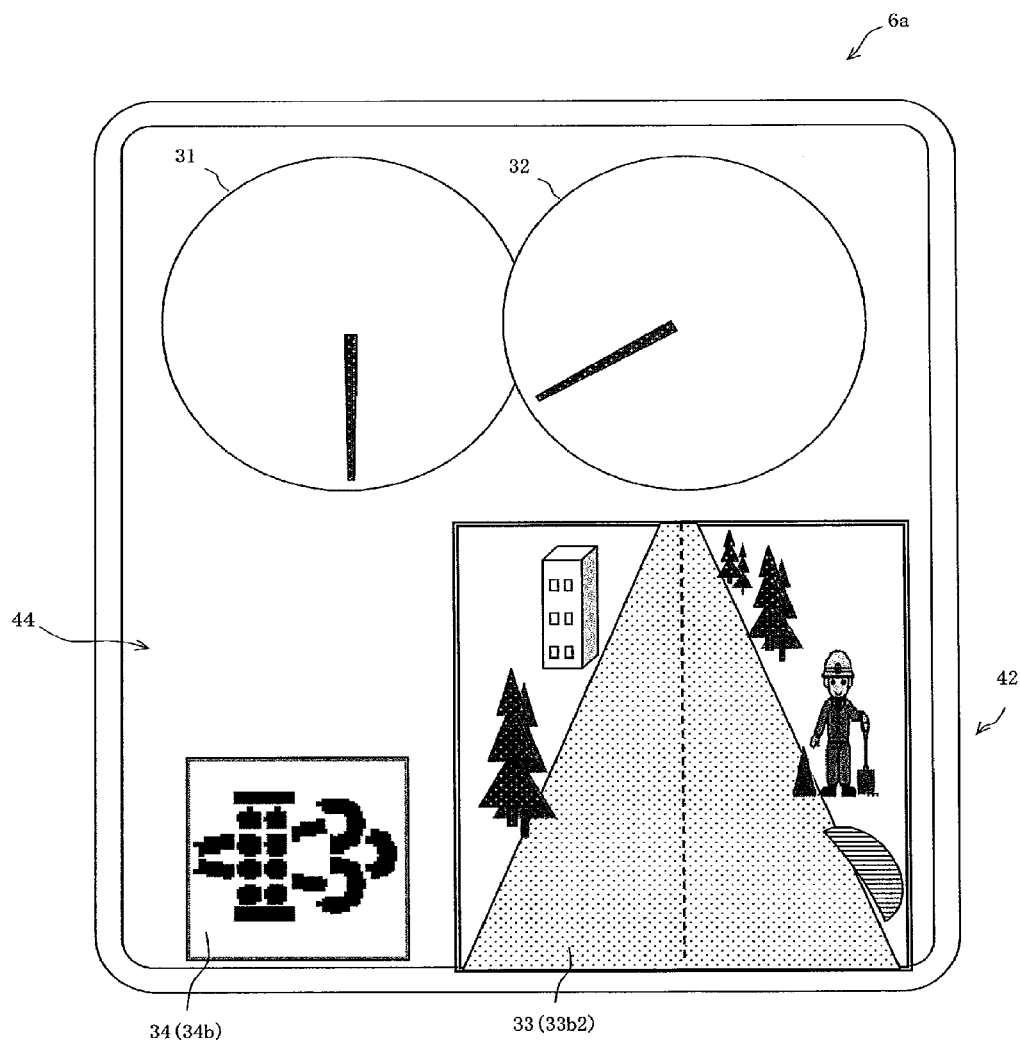
FIG. 7 shows another example of the display screen in abnormal times (importance level: high).
Figure 8:
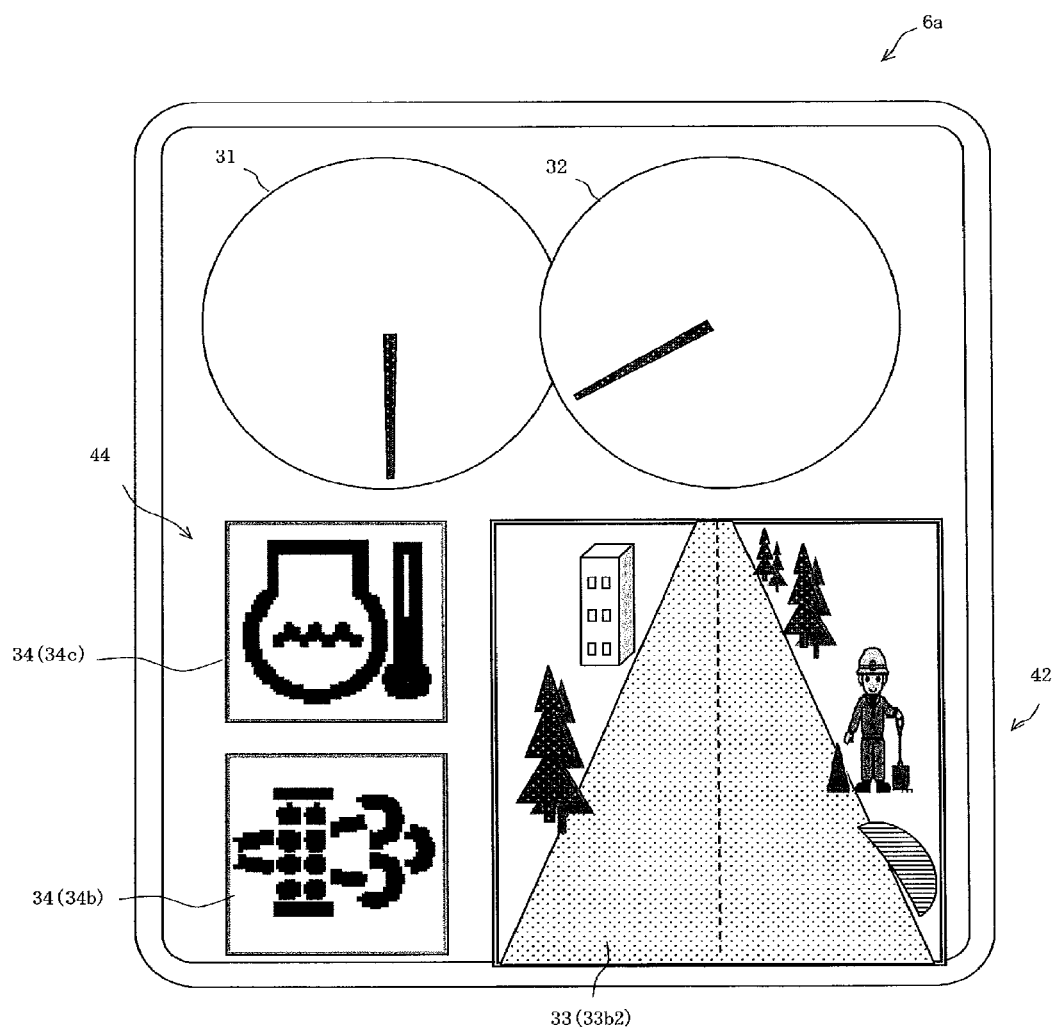
FIG. 8 shows another example of the display screen in abnormal times (importance level: high).

The camera image reduction function 53d receives an abnormality information signal from the abnormality judgment unit 51a or 52a via the communication line 54 and redisplays a reduced camera image 33b at a prescribed reduction scale (see FIGS. 6-8). The reduction scale is set at 60% when the importance level of the abnormality information is high, and at 80% when the importance level of the abnormality information is low.

The abnormality information importance level judgment function 53e receives the abnormality information signal and judges the importance level of the inputted abnormality information. For example, an importance level (high, low) may previously be set for each piece of abnormality information in a table. The importance level may be set low for abnormalities like clogging of the hydraulic fluid filter and abnormal sensitivity of the hydraulic pump load pressure sensor 23. The importance level may be set high when clogging of the filter of the DPF device 13 has occurred and the regeneration of the filter is necessary, for example. An abnormality of a high importance level means an abnormality that has a high probability of leading to a failure or accident if the operation of the hydraulic shovel is continued.

The warning icon display function 53f receives the abnormality information signal and displays a warning icon 34 corresponding to the inputted abnormality information in an open area 44 caused in the camera image area 42 by the image reduction (see FIGS. 6-8). A large warning icon is displayed when the abnormality information is of the high importance level and a small warning icon is displayed when the abnormality information is of the low importance level.

The display control device 53 has an image storage unit (not shown). The image storage unit stores images regarding the basic information on the coolant temperature indicator 31 and the fuel level indicator 32, images of the warning icons 34, etc.

<Operation>

FIG. 5 shows an example of the display screen in normal times.

In normal times, the coolant temperature indicator 31 and the fuel level indicator 32 (as images regarding the basic information on the vehicle body status of the hydraulic shovel) are displayed in the basic information display area 41 of the monitor display unit 6a of the monitor 6. Meanwhile, the camera image 33a acquired from the camera 10 is displayed in the camera image area 42.

The operator checks the vehicle body status while viewing the coolant temperature indicator 31 and the fuel level indicator 32, checks the safety of the surroundings while viewing the camera image 33a, and carries out an operation such as excavation.

FIG. 6 shows an example of the display screen in abnormal times. In this example, the display screen is indicating the clogging (abnormality) of the hydraulic fluid filter.

The hydraulic fluid filter is arranged in the hydraulic line returning to the tank so as to filter the hydraulic fluid. The clogging of the hydraulic fluid filter occurs as the hydraulic shovel is used for a long time. The vehicle body control device 51 receives a pressure signal from the differential pressure sensor 22 (sensor 24). The abnormality judgment unit 51a of the vehicle body control device 51 judges whether an abnormality has occurred or not based on the pressure information and outputs an abnormality information signal to the display control device 53 via the communication line 54 when an abnormality is judged to have occurred.

The abnormality information importance level judgment function 53e of the display control device 53 receives the abnormality information signal regarding the clogging of the hydraulic fluid filter and judges that the importance level is low. The camera image reduction function 53d redisplays a reduced camera image 33b1 which is acquired by image reduction at the reduction scale 80% employed when the importance level is low. The camera image 33b1 is acquired by reducing the camera image 33a in the horizontal direction at the reduction scale 80%. The open area 44 occurs in part of the camera image area 42 outside the area displaying the camera image 33b1.

The warning icon display function 53f displays a warning icon 34a corresponding to the abnormality information regarding the clogging of the hydraulic fluid filter in the open area 44. The warning icon 34a is a small-sized icon.

The abnormality regarding the clogging of the hydraulic fluid filter is not an abnormality of the high importance level which increases the probability of a failure or accident with the continuation of the operation. In spite of recognizing the warning icon 34a, the operator checks the vehicle body status while viewing the coolant temperature indicator 31 and the fuel level indicator 32, checks the safety of the surroundings while viewing the camera image 33a, and continues the operation (e.g., excavation). After finishing the operation, the operator requests the maintenance staff to replace the hydraulic fluid filter.

FIG. 7 shows another example of the display screen in abnormal times. In this example, the display screen is indicating the clogging (abnormality) of the filter of the DPF device 13.

The DPF device 13 is equipped with the filter for collecting the particulate matter. The clogging of the filter occurs as the hydraulic shovel is used for a long time. The vehicle body control device 51 receives a pressure signal from the differential pressure sensor 21 (sensor 24). The abnormality judgment unit 51a of the vehicle body control device 51 judges whether an abnormality has occurred or not based on the pressure information and outputs an abnormality information signal to the display control device 53 via the communication line 54 when an abnormality is judged to have occurred.

The abnormality information importance level judgment function 53e of the display control device 53 receives the abnormality information signal regarding the clogging of the filter of the DPF device 13 and judges that the importance level is high. The camera image reduction function 53d redisplays a reduced camera image 33b2 which is acquired by image reduction at the reduction scale 60% employed when the importance level is high. The camera image 33b2 is acquired by reducing the camera image 33a in the horizontal direction at the reduction scale 60%. The open area 44 occurs in part of the camera image area 42 outside the area displaying the camera image 33b2.

The warning icon display function 53f displays a warning icon 34b corresponding to the abnormality information regarding the clogging of the filter of the DPF device 13 in the open area 44. The warning icon 34b is a large-sized icon.

The abnormality regarding the clogging of the filter of the DPF device 13 is an abnormality of the high importance level which can lead to the melting of the filter (due to abnormal combustion) if no countermeasure is taken. While the filter has to be regenerated as soon as possible in this case, the filter regeneration cannot be performed at a place where there is a combustible nearby since emission of high-temperature exhaust gas continues for several minutes in the filter regeneration. Thus, the operator recognizing the warning icon 34b immediately stops the operation, moves the hydraulic shovel to a place where the filter regeneration is possible while checking the safety of the surroundings by viewing the camera image 33b2, and then carries out the filter regeneration.

After the regeneration is finished, the warning icon display function 53f erases the warning icon 34b and the camera image display function 53b displays the non-reduced camera image 33a in the camera image area 42 (see FIG. 5). The operator confirms that the warning icon 34b has disappeared, moves the hydraulic shovel to the site of the operation while checking the safety of the surroundings by viewing the camera image 33a, and then restarts the operation.

FIG. 8 shows another example of the display screen in abnormal times. In this example, the display screen is indicating an abnormality of the engine coolant temperature (overheat) in addition to the clogging (abnormality) of the filter of the DPF device 13.

The engine is equipped with a cooling system for cooling down the engine. The engine coolant temperature can rise when the hydraulic shovel is used for a long time. The engine control device 52 receives a temperature measurement signal from a coolant temperature sensor (sensor 25). The abnormality judgment unit 52a of the engine control device 52 judges whether an abnormality has occurred or not based on the temperature measurement information and outputs an abnormality information signal to the display control device 53 via the communication line 54 when an abnormality is judged to have occurred.

The abnormality information importance level judgment function 53e of the display control device 53 receives the abnormality information signal regarding the overheat and judges that the importance level is high. The warning icon display function 53f displays a warning icon 34c corresponding to the abnormality information regarding the overheat in the open area 44 together with the warning icon 34b.

The operator recognizing the warning icon 34c immediately stops the operation, moves the hydraulic shovel to a place where there is no interference with other operations while checking the safety of the surroundings by viewing the camera image 33b2, and then sets the engine revolution speed at the idling revolution speed.

The warning icon display function 53f erases the warning icon 34c when the engine coolant temperature has returned to the normal temperature. When the warning icon 34b is also erased by the warning icon display function 53f as explained above, the camera image display function 53b displays the non-reduced camera image 33a in the camera image area 42 (see FIG. 5). The operator confirms that the warning icons 34b and 34c have disappeared, moves the hydraulic shovel to the site of the operation while checking the safety of the surroundings by viewing the camera image 33a, and then restarts the operation.

<Effect>

The conventional display system superimposing the warning information and the camera image together in a style allowing the camera image to be viewed through had the problem that the superimposition area in the camera image becomes hard to see due to slight image quality deterioration.

In contrast, in this embodiment, the display control device 53 displays the camera image 33 in a reduced size based on the abnormality information signal while also displaying the warning icon 34 in the open area 44 caused in the camera image area 42 by the image reduction.

The reduced camera image 33 does not overlap with the warning icon 34 and maintains high image quality. In other words, the warning icon 34 can be displayed while also displaying the high-quality camera image 33. This allows the operator to move the hydraulic shovel to a place where there is no interference with necessary operations (in order to check the cause and details of the warning) while recognizing the warning icon 34 and checking the safety of the surroundings by viewing the high-quality camera image 33, Another effect will be explained below.

There are multiple types of warning icons 34 and not all the warning icons 34 are of the same importance level. In this embodiment, an importance level is previously set for each piece of abnormality information in a table and the importance level is judged for each piece of abnormality information. While the operator continues the operation when the importance level is low, unnecessarily significant reduction of the camera image 33 is undesirable from the viewpoint of the safety check during the operation.

In this embodiment, the camera image 33b1 is redisplayed at the reduction scale 80% and a sufficient image size of the camera image 33 for the safety check during the operation is maintained. This allows the operator to check the safety during the operation even when the warning icon 34 is displayed.

When the importance level is high, there is a possibility that the small warning icon 34a cannot sufficiently call the operator's attention.

In this embodiment, the warning icon 34b or 34c larger than the warning icon 34a for the low importance level is displayed, sufficiently calling the operator's attention.

Another effect will be explained below.

Suppose the camera image 33a is reduced both in the horizontal direction and in the vertical direction, an open area 46 (not shown) occurring in the vertical direction is smaller than the open area 44 and is insufficient for displaying an image such as the warning icon 34, that is, efficient use of the open area 46 is difficult. Meanwhile, it is desirable to avoid the reduction of the camera image 33 as much as possible.

In general, the image reduction is mostly performed at the same reduction scale in the horizontal direction and in the vertical direction. This is because the aspect ratio of an image is also important information on the image. For example, in cases of images of natural scenery or human facial expression, a change in the aspect ratio substantially changes the impression given to the viewer.

In the case of the camera image 33, however, letting the operator correctly check the presence/absence of a monitoring target (e.g., whether or not a worker exists in back of the hydraulic shovel) is important from the safety viewpoint, whereas the aspect ratio of the image is not so important. Therefore, the original purpose of displaying the camera image is achieved even if the aspect ratio of the camera image 33 changes in some degree.

In this embodiment, the camera image 33b1 is acquired by reducing the camera image 33a in the horizontal direction (longitudinal direction) at the reduction scale 80%. The camera image 33b2 is acquired by reducing the camera image 33a in the horizontal direction at the reduction scale 60%.

This makes it possible to secure the open area 44 for displaying the warning icon 34 while avoiding unnecessarily significant reduction of the camera image 33 since the image is not reduced in the vertical direction (reduction scale: 100%).

<Modification>

While the first image displayed constantly was the camera image 33 acquired from the camera 10 and the first image area was the camera image area 42 in the above embodiment, it is also possible to define the first image as the image regarding the basic information on the coolant temperature indicator 31 and the fuel level indicator 32 and the first image area as the basic information display area 41.

Figure 9:
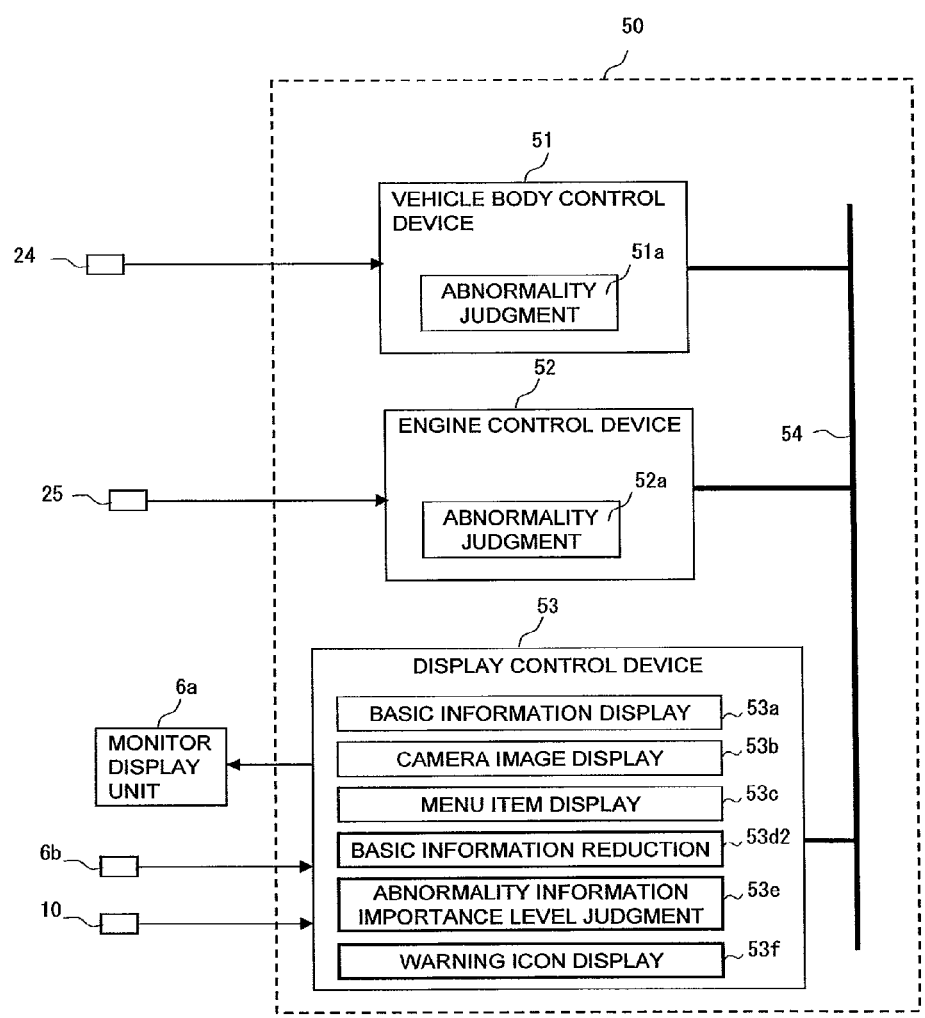
FIG. 9 is a block diagram showing the details of a control device (modification).

FIG. 9 is a block diagram showing the details of a control device 50 in accordance with a modification of the embodiment. The display control device 53 includes a basic information reduction function 53d2 in place of the camera image reduction function 53d. The basic information reduction function 53d2 receives an abnormality information signal from the abnormality judgment unit 51a or 52a via the communication line 54 and redisplays a reduced image regarding the basic information on the coolant temperature indicator 31 and the fuel level indicator 32 at a prescribed reduction scale.

Figure 10:
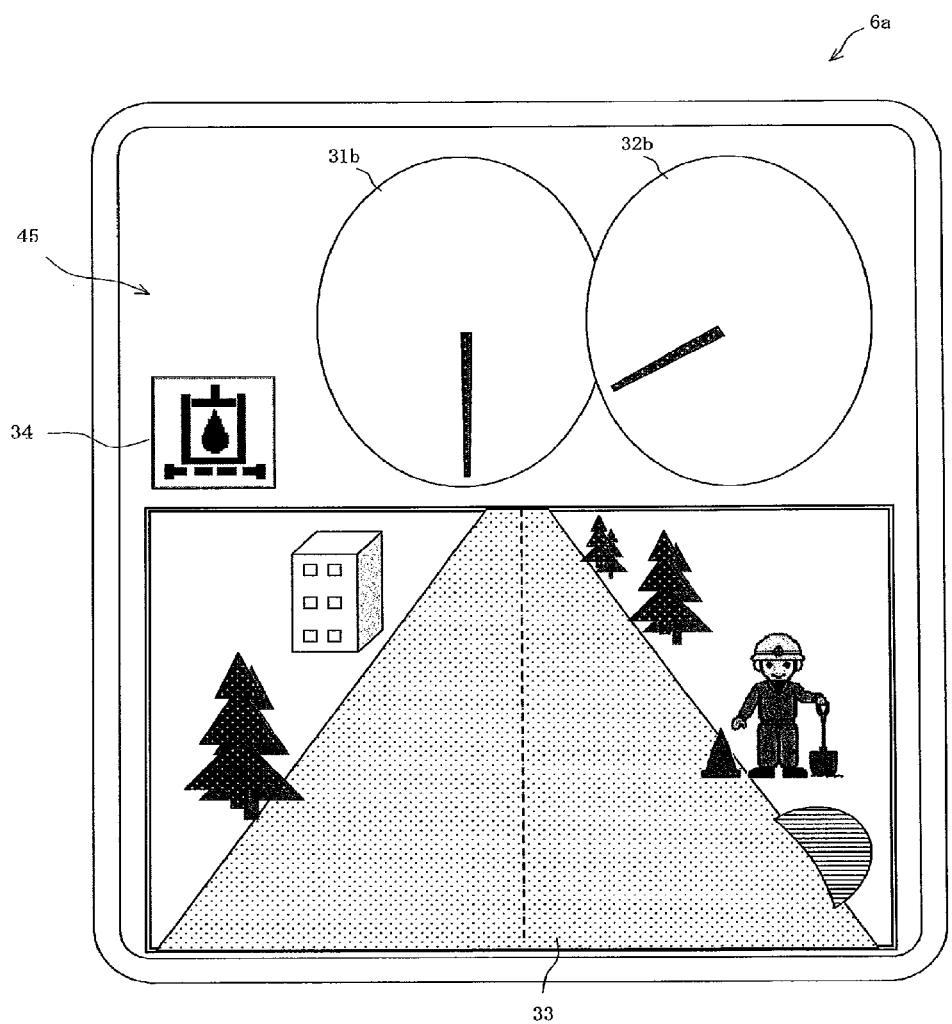
FIG. 10 shows an example of the display screen in abnormal times (modification).

FIG. 10 shows an example of the display screen in abnormal times in accordance with the modification.

The coolant temperature indicator 31b and the fuel level indicator 32b are displayed by reducing the basic information on the coolant temperature indicator 31 and the fuel level indicator 32 in the horizontal direction at the reduction scale 80%. An open area 45 (second image area) occurs in part of the basic information display area 41 outside the area displaying the coolant temperature indicator 31*b* and the fuel level indicator 32*b*. The warning icon 34 is displayed in the open area 45.

In this case, sufficient image sizes of the coolant temperature indicator 31 and the fuel level indicator 32 for letting the operator check the vehicle body information during the operation are maintained. This allows the operator to continue the operation even when the warning icon 34 is displayed.

Meanwhile, the camera image 33 maintains high image quality and is not even reduced. The operator can move the hydraulic shovel to a place where there is no interference with necessary operations (in order to check the cause and details of the warning) while recognizing the warning icon 34 and checking the safety of the surroundings by viewing the high-quality camera image 33, While the second image was the warning icon 34 corresponding to the abnormality information in the above embodiment, it is also possible to display an image regarding a different type of information.

DESCRIPTION OF REFERENCE CHARACTERS

1 lower track structure
2 upper swing structure
3 front work implement
4 cab
5 cab seat
6 monitor
10 camera
11 engine
12 fuel injection device
13 DPF device
14 regeneration fuel injection device
15 hydraulic pump
16 control valve
17 hydraulic actuator
18 pilot pump
19 operating device
21 differential pressure sensor
22 differential pressure sensor
23 load pressure sensor
24, 25 sensor
31 coolant temperature indicator (basic information image)
32 fuel level indicator (basic information image)
33 camera image
34 warning icon
41 basic information display area
42 camera image area
43 whole area
44, 45 open area
50 control device
51 vehicle body control device
51*a* abnormality judgment unit
52 engine control device
52*a* abnormality judgment unit
53 display control device
54 communication line
53*a* basic information display function
53*b* camera image display function
53*c* menu item display function
53*d* camera image reduction function
53*d*2 basic information reduction function
53*e* abnormality information importance level judgment function
53*f* warning icon display function

The invention claimed is:

1. A display system for a working machine, comprising a monitor and a display control device for displaying a prescribed image on the monitor, wherein the display control device has:

a first image display function of displaying a constantly displayed first image in a first image area on the monitor;

a first image reduction function of displaying the first image in a reduced size according to a prescribed signal; and a second image display function of displaying a second image regarding the prescribed signal in a second image area as an open area in the first image area outside the area of the first image displayed in the reduced size, wherein:

the display system for a working machine further comprises abnormality detection means which detects an abnormality of the working machine, the prescribed signal is an abnormality information signal from the abnormality detection means, the second image is warning image corresponding to the abnormality information acquired from the abnormality detection means, an importance level of each piece of abnormality information is set in the display control device, and the display control device further has an importance level judgment function of judging the importance level of the abnormality information acquired from the abnormality detection means, the first image reduction function sets a reduction scale for the first image based on the importance level judged by the importance level judgment function and displays the first image in a reduced size according to the reduction scale, and the second image function displays the warning image in a size corresponding to the importance level in the second image area as the open area.

2. The display system for a working machine according to claim 1, further comprising a camera which captures images of the surroundings of the working machine, wherein the first image is a camera image acquired from the camera.

3. The display system for a working machine according to claim 1, wherein the first image reduction function displays the first image by reducing the first image in a longitudinal direction.

* * * * *